(12) United States Patent
Frechet et al.

(10) Patent No.: US 7,101,937 B1
(45) Date of Patent: Sep. 5, 2006

(54) DENDRITIC BASED MACROMOLECULES

(76) Inventors: Jean M. J. Frechet, 25 Fairway Dr., Ithaca, NY (US) 14850; Craig J. Hawker, 280 Sir Fred Schonell Dr., St. Lucia, 4067 (AU); Karen Wooley, 380 Floral Ave., #14, Ithaca, NY (US) 14850

( * ) Notice: Subject to any disclaimer, the term of this patent is extended or adjusted under 35 U.S.C. 154(b) by 0 days.

(21) Appl. No.: 08/422,627

(22) Filed: Apr. 14, 1995

Related U.S. Application Data

(63) Continuation of application No. 07/868,535, filed on Apr. 14, 1992, now abandoned.

(51) Int. Cl.
*C08F 255/00* (2006.01)

(52) U.S. Cl. .................. 525/258; 525/50; 525/259; 525/302; 525/304; 525/310; 528/44; 528/45; 528/60

(58) Field of Classification Search ................ 525/259, 525/309, 310; 528/44, 45, 60, 70, 72
See application file for complete search history.

(56) References Cited

U.S. PATENT DOCUMENTS

| | | | |
|---|---|---|---|
| 4,507,466 A | | 3/1985 | Tomalia |
| 4,558,120 A | | 12/1985 | Tomalia |
| 4,568,737 A | | 2/1986 | Tomalia |
| 4,587,329 A | | 5/1986 | Tomalia |
| 4,694,064 A | | 9/1987 | Tomalia |
| 4,737,550 A | | 4/1988 | Tomalia |
| 4,857,599 A | * | 8/1989 | Tomalia et al. ............. 525/259 |
| 4,871,779 A | | 10/1989 | Killat et al. |
| 5,041,516 A | * | 8/1991 | Frechet et al. ................ 528/44 |
| 5,338,532 A | | 8/1994 | Tomalia |

FOREIGN PATENT DOCUMENTS

EP    0 271 180    6/1988

OTHER PUBLICATIONS

Polymer Preprints, V 32, No 3, Aug. 1991 pp. 629–632.*
Flory, "Molecular Size Distribution in three Dimensional Polymers", J. Am. Chem Soc., 74, 2719 (1952).
Vogtle et al., "'Cascad' and 'Nonskid–Chain–like' Syntheses of Molecular Cavity Topologies", Synthesis, 155, (Feb. 1978).
Aharoni et al., "Size and Solution Properties of Globular tert–Butyloxycarbonyl–poly($\alpha$, $\epsilon$–L–lysine)", Marcromolecules, 15, 1093, (1982).
Newkome et al., "Cascade Molucules: A New Approach to Micelles", J. Am. Chem Soc., 50, 2003 (1985).
Newkome et al., "Two–Directional Cascade Molecules . . . ", J. Am. Chem Soc., 752, (1986).
Newkome et al., "Cascade Molecules: Synthesis and Characterization . . . ", J. Am. Chem Soc., 108, 849, (1986).

* cited by examiner

*Primary Examiner*—Christopher S. F. Low
*Assistant Examiner*—David Lukton
(74) *Attorney, Agent, or Firm*—Bruce F. Jacobs

(57) ABSTRACT

Macromolecules in the shape of three-dimensional kites, barbells, and other shapes are disclosed. The shaped macromolecules are prepared the reaction of one or more dendritic polymers and a linear polymer. The kite-shaped macromolecules are dendritic polymers attached at either their focal points or at an outer to a long carbon chain group. The barbell macromolecules have dendritic polymers at either end of the molecule, which polymers are connected together through the focal points of each by a suitable connecting substituent such as a linear polymer. The shaped macromolecules are used in specialty medical and technological applications including such as drug delivery agents, imaging materials, molecular devices, thin film devices, surface modifiers, transport agents, compatibilizers, rheology control agents, molecular ball bearings, molecular dipoles, non-linear optical materials, medical imaging agents, membrane and cell modifiers, complexing agents, adhesives, interface strengthening agents, and the like.

15 Claims, 11 Drawing Sheets

US 7,101,937 B1

DENDRITIC BASED MACROMOLECULES

This is a continuation of application Ser. No. 07/868,535 filed on Apr. 14, 1992, now abandoned.

BACKGROUND OF THE INVENTION

Work in the field of dendritic molecules dates back to the early fifties with the publication of a theoretical paper by Flory, *J.Am. Chem. Soc.*, 74, 2719 (1952). Basically, a dendritic molecule is a highly branched polymer molecule.

The prior art reports various ways to prepare such dendritic molecules. For example, Vogtle and coworkers, *Synthesis* 155 (1978) described a "cascade" approach. This approach is not capable of producing a dendritic molecule having a molecular weight of greater than 790 Daltons. More recently, Newkome used a nucleophilic displacement reaction on a multi-functional core to produce, after two stages of reaction, a cascade molecule coined "arboral" with molecular weights of up to 1600 Daltons. See, for example, Aharoni et al, *Macromolecules* 15, 1093 (1982); *J. Org. Chem.* 50, 2004 (1985); Newkome et al. *J. Chem. Soc. Chem. Commum.*, 752 (1986); and Newkome et al. *J. Am. Chem. Soc.* 108, 849 (1986).

The most extensive published studies of dendritic molecules are directed to "starburst" polymers. See, for example, U.S. Pat. Nos. 4,507,466; 4,558,120; 4,568,737; 4,587,329; 4,737,550; and 4,857,599. Such "starburst" polymers are made by a divergent approach building the molecule from the core towards its extremities.

More recently, two co-inventors of this invention obtained a patent, U.S. Pat. No. 5,041,516, describing a novel convergent approach to produce dendritic molecules. In this approach, the molecule is built from the outside towards the core. This approach enables the accurate placement of one or more functional groups in the outer surface of the dendritic polymer.

Once formed by whatever method, the dendritic polymers have many uses such as polymer crosslinking agents, drug delivery systems, optoelectronic; carriers for synthetic enzymes and genetic materials, etc. In U.S. Pat. No. 5,041,516, at columns 5 and 6, lines 60–13 uses for dendritic polymers which include the formation of macromolecules having identifiable shapes such as "barbells", "knots", etc. is disclosed. The disclosure is, however, very limited as to how to make such structures. For example, with respect to barbells, the only disclosure of how to produce such a shape is limited to a "barbell" shape produced from 2 dendritic molecules having surface functional groups at which point they are joined together by a connecting linkage. This procedure is disclosed at col. 6, lines 12–13, and Example VI. The only other specific disclosure relates to a "knot" structure formed by reacting a dendritic polymer having opposed COOH groups with a simple dialcohol or a polyester or polystyrene based dialcohol. This is disclosed at col. 6, lines 1–11, and in Example IX. No other specific shapes are disclosed and no other processes are disclosed to make the specifically disclosed macromolecule shapes.

Tomalia et al U.S. Pat. No. 4,694,064 also discloses certain shaped macromolecules. Specifically, rod-shaped dendrimers are disclosed as useful shaped macromolecules. Tomalia et al U.S. Pat. Nos. 4,857,599 and 4,871,779 disclose chemical modification of dendritic arms onto a preformed polymer.

Shaped macromolecules may have particular uses that simple dendritic polymers do not. Accordingly, it is one of the objects of the present invention to develop novel macromolecule shapes.

Another object is to develop novel processes for preparing known macromolecule shapes.

SUMMARY OF THE PRESENT INVENTION

Accordingly, the present invention is directed to novel dendritic based macromolecules shapes. Dendritic polymers, especially those prepared by the convergent growth method as disclosed in U.S. Pat. No. 5,041,516, which is incorporated herein by reference, may be prepared with unique reactive sites located at both the focal point and at the periphery or chain ends of the molecule. "Dendrimer" or "dendritic polymer" as used herein refers to any and all generations of dendritic polymers from a 1st generation wedge to a 5th or greater generation dendritic polymer. They also include dendritic wedges or fragments that are attached to a polyfunctional core through their focal points. They also include dendritic polymers produced by whatever method including "starburst" polymers such as those disclosed by Tomalia et al U.S. Pat. No. 4,857,599. By design, the reactive sites on the dendrimers may be the same or different and are available for further chemical reaction. Such reactions can be designed to take place at the focal point of the dendrimer only, at the periphery only, or at both the focal point and the periphery, or at one site followed by a different reaction at the other.

One novel shape which may be produced according to the present invention is a "barbell" shaped macromolecule having dendritic fragments at either end of the molecule, which fragments are connected together at the focal point of each dendrimer by a suitable connecting substituent such as a linear polymer or the like. As defined herein, "focal point" of a dendritic molecule is used to refer to the geometric location or point towards which all of the branches converge. Since a dendritic molecule is a three-dimensional "tree-like" structure by definition, the focal point is like the base of the trunk of a very regular tree, where all the branches converge. Such macromolecules are different from the "barbell" shapes disclosed in U.S. Pat. No. 5,041,516 in that the only "barbell" shape specifically disclosed therein is formed by connecting two dendrimers at their outer surfaces, not at their focal points.

Another novel shape according to the present invention is a "kite" shaped macromolecule which generally comprises a dendritic polymer attached at its focal point to a long carbon chain group such as a linear polymer or a combination of a linear polymer and another straight chain substituent. Alternatively, kite shaped structures may be formed by connecting such long carbon chain groups to the surface of a dendritic polymer rather than the focal point.

Another novel structure which may be prepared is a "triblock" structure composed of a single dendritic polymer in the center of a molecule flanked on either side by a long chain carbon substituent such as a linear polymer. Still other novel shapes are polymerized vinyl macromonomers produced by a copolymerization process of a vinyl monomer with a vinyl macromonomer.

The present invention also discloses a novel polymerization process for producing a "knot" shaped molecule with re-occurring dendritic polymers linked together by a repeating substituent and to a process for producing certain starburst dendrimers by a one step process.

Due to their unusual shapes or architectures, it is believed that the Theological properties, viscosity, solubility, of the molecules will be unique. The shapes of the molecules may allow their use in specialty medical and technological applications such as drug delivery agents, imaging materials, molecular devices, thin film devices, surface modifiers, transport agents, compatibilizers, rheology control agents, molecular ball bearings, molecular dipoles, non-linear optical materials, medical imaging agents, membrane and cell modifiers, complexing agents, and the like.

DETAILED DESCRIPTION OF THE PREFERRED EMBODIMENTS

Figure 1:
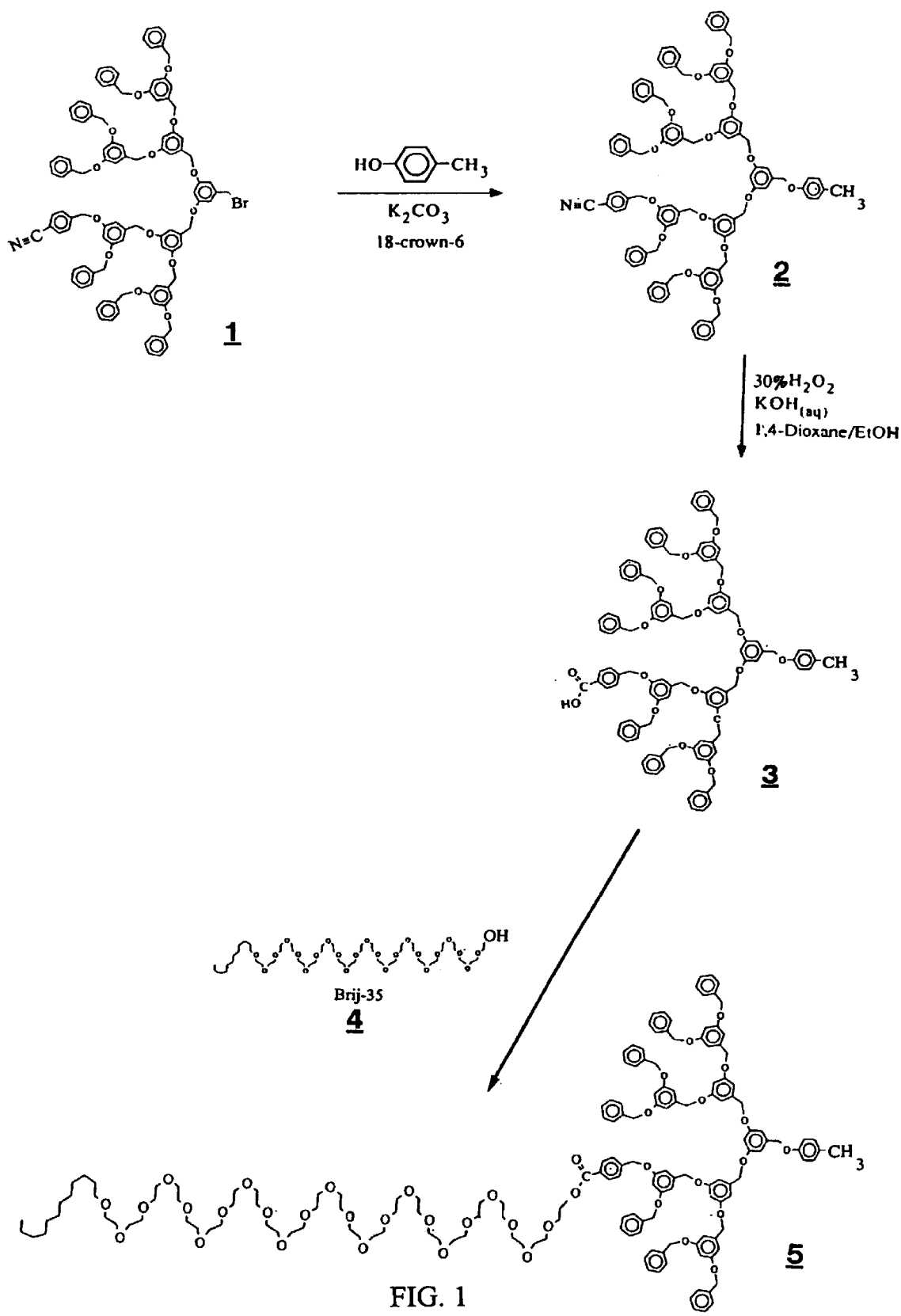
FIGS. 1, 2, 3, 4, 5 6, 7, 8, 9A, 9B, and 9C are pictorial representations of the reactions of Examples 1–9 respectively.

In order to simplify the discussion of the present invention, "dendritic polymer" or "dendrimer" are used herein to refer to all generations of dendritic wedges and the products obtained from attachment of dendritic wedges to core molecules. For example, the terms "dendrimer" and "dendritic polymer" include macromolecules such as those of formula 1:

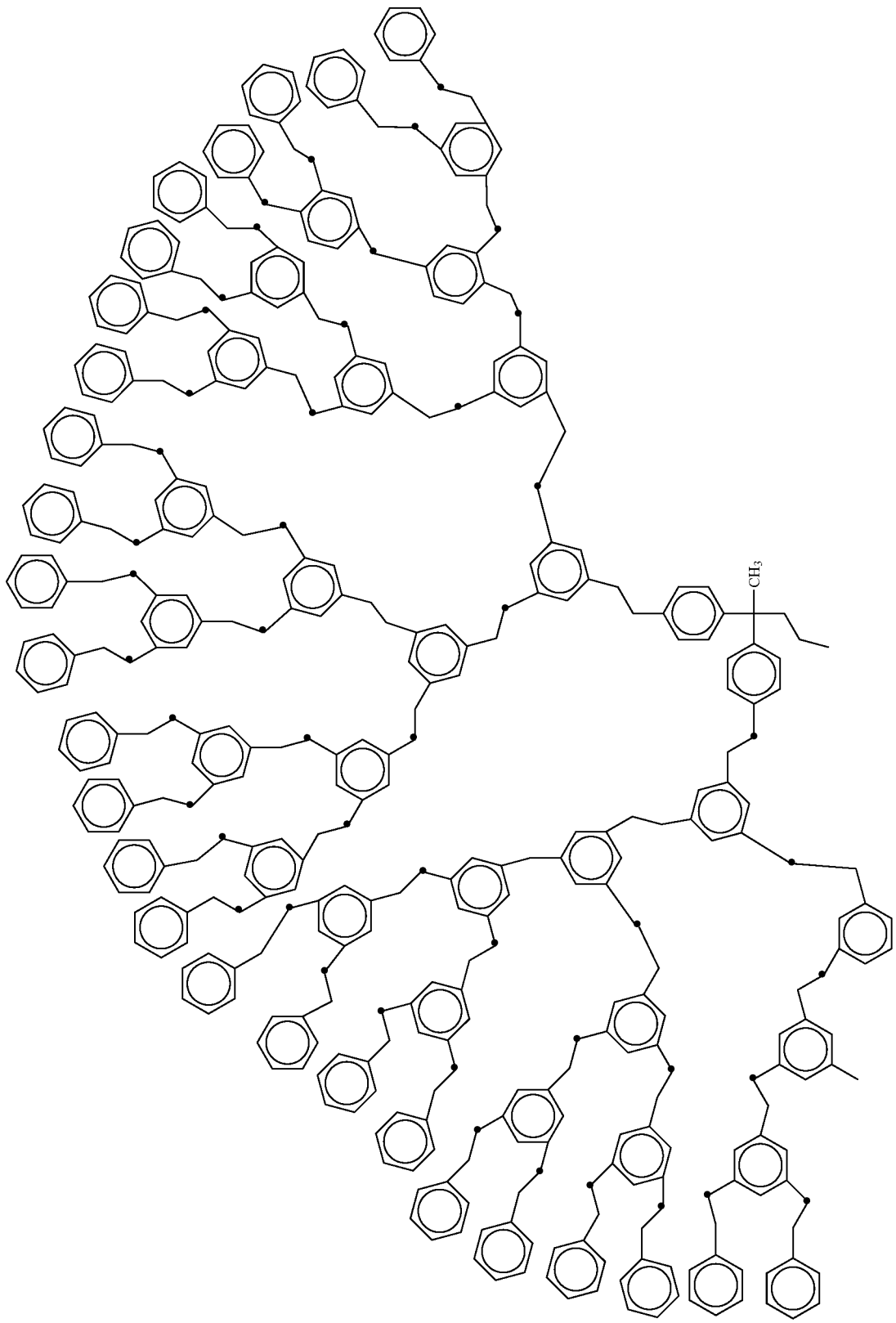

-continued
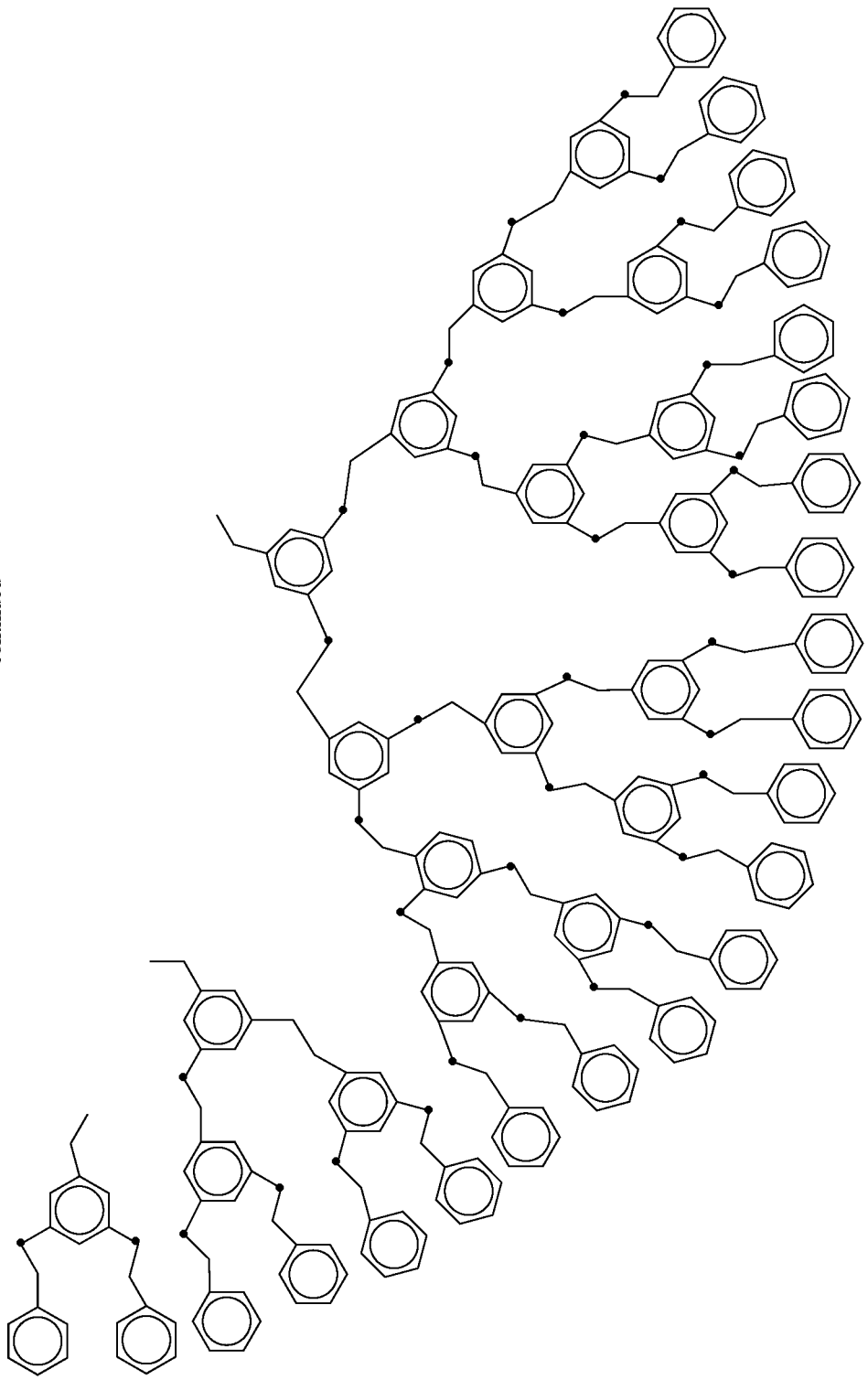

and molecules of formula 2:
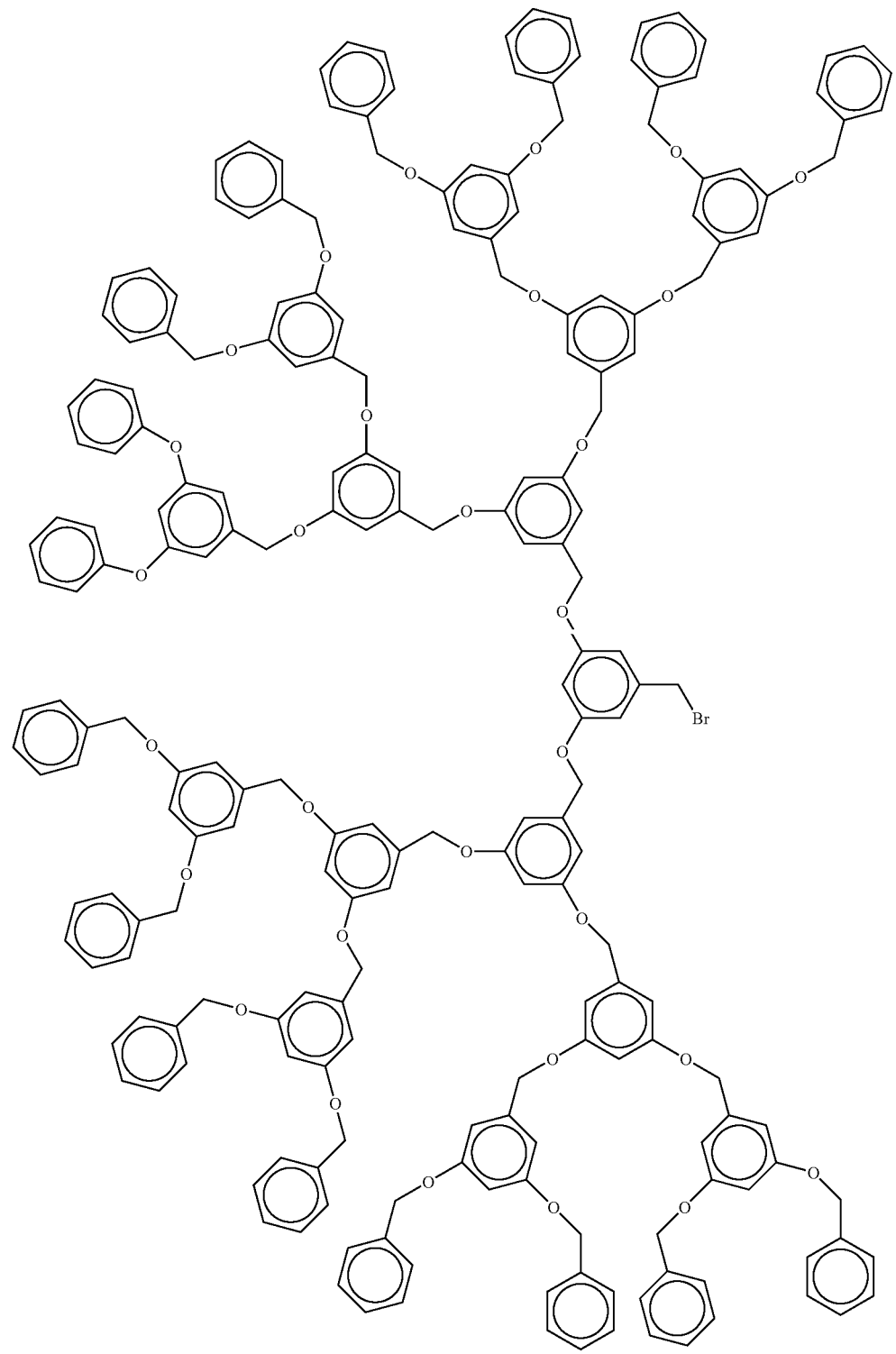
They also include "starburst" polymers of U.S. Pat. No. 4,857,599, 4,507,466, 4,558,120, 4,568,737, 4,587,329 and 4,737,550, each of which is incorporated herein by reference. In describing the invention all such dendritic polymers are simply represented by the generic symbols:

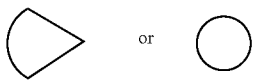

These two-dimensional symbols are used to represent three-dimensional globular or spheroidal shapes. The first symbol is meant to represent a dendritic fragment or wedge with a focal point at the pointed angular end. The second symbol (circle) represents either (i) a dendritic molecule obtained by convergent growth through attachment of several dendritic fragments or wedges to a central core, whether a complete spheroid is produced or not, or (ii) a starburst polymer.

Any functional groups attached at the focal point or the periphery of the molecule will be shown as substituents attached thereto. While it is presently preferred to prepare such dendritic polymers by the convergent approach as described in U.S. Pat. No. 5,041,516, the dendritic polymer may be prepared by any suitable method known in the art including the divergent approach as described in U.S. Pat. Nos. 4,289,872, 4,568,737, 4,587,329 and 4,737,550.

The convergent growth method, however, is presently preferred because it permits the precise placement of both focal point and periphery functional groups which is important to the production of certain shaped macromolecules.

One of the novel shaped dendritic based macromolecules according to the present invention is a "kite" shaped macromolecule of the general formula 3:

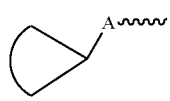

3 wherein A is a connecting group such as $CH_2$, $CH_2O$, COO, CONH, O, $CH_2Ph$, NHCOO, NHCONH, $Si(CH_3)_2$, CH(OH), CO, S, SO, $SO_2$, $SO_2NH$, $CH_2CH(Ph)_2$, CH=CH, Ph, and the like; wherein〰
is a linear polymer such as polystyrene, polycarbonate, polyester, polyamide, polycarbonate, polyolefin, polyethylene glycol, polyacrylate, polymethacrylate, polysulfone, polyetherketone, polyacetal, polyether, polythioether, polyoxazoline, polyphosphazene, polysiloxane, polyanhydride, polyurethane, polyphenylene, polysaccharide, and other vinyl polymers derived from simple monomers such as vinyl acetate, vinyl chloride, acrylonitrile or vinyl carbazole. As used herein and throughout this application, "Ph" represents a phenyl group. While the A groups are written as above, they may be connected in either direction, e.g. —COO or —OCO—. These and other similarly useful families of polymers are well known in the art and are defined in textbooks such as *Principles of Polymerization*, third edition, by George Odian (Wiley-Interscience, 1991) or *Comprehensive Polymer Science*, edited by G. Allen and J. C. Bevington, Pergamon Press, 1989.

Alternatively, the "kite" shape may be represented by the general formula 4:

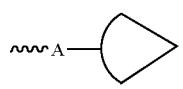

4 wherein A and〰
are as described previously.

Still another "kite" shape is represented by the general formula 5:

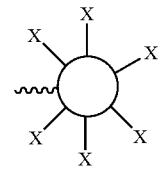

5 wherein〰
is a linear polymer as described previously and wherein the structure:

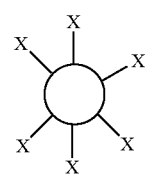

5A represents a starburst dendritic polymer with multiple reactive groups X. Such starburst dendritic polymers are of the type disclosed in U.S. Pat. No. 4,857,599. While six functional groups X are shown above, it is representative only and this structure may have more or less than 6 functional groups X. Suitable functional groups X include $NH_2$, $COOCH_3$, $CH_2OH$, CN, $CH_2Br$, or CHO.

Alternately a similar "kite" shape represented by the general formula 6:

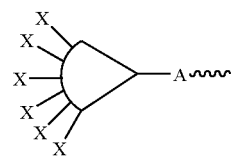

6 can be prepared by the convergent growth approach using as the starting material a wedge structure in which the chain ends carry one or more functional groups X. Suitable functional groups X include halogens, halomethyl groups such as $CH_2Br$ or $CH_2Cl$, CN, COOH, $COOCH_3$, $CONH_2$, $CONHCH_3$, OH, $Si(CH_3)_3$, $CH_2OH$, CHO, $B(OH)_2$ and the like. Examples of this type start with wedges such as $Br_{16}$—[G-4]—Br described by K. L. Wooley et al. in *Journal of the Chemical Society*, Perkin Transactions I, 1991, 1059. In this formula, A is defined as it was previously.

Another macromolecule shape according to the present invention is a focal point connected "barbell" shape. This shape is shown by the general formula 7:

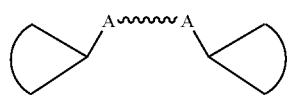

7 wherein A and〰
are as defined previously. The two A linkages may be the same or different.

Still another "barbell" shape is a starburst dendritic polymer barbell of the formula 8:

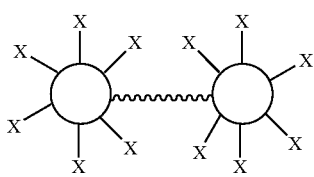

wherein the structure:

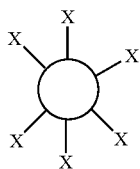

is as described previously, and wherein〰〰
is a linear polymer as described previously or, alternatively is an aliphatic chain, a biphenyl, or other small molecule.

Another novel dendritic based macromolecule of the present invention is a "tri-block" shape shown by the general formula 9:

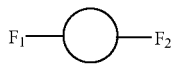

wherein $F_1$ and $F_2$ are the same or different and are each selected from linear polymers such as polystyrene, polycarbonate, polyester, polyamide, polycarbonate, polyolefin, polyethylene glycol, polyacrylate, polymethacrylate, polysulfone, polyetherketone, polyacetal, polyether, polythioether, polyoxazoline, polyphosphazene, polysiloxane, polyanhydride, polyurethane, polyphenylene, polysaccharide, and other vinyl polymers derived from simple monomers such as vinyl acetate, vinyl chloride, acrylonitrile or vinyl carbazole. For example, when $F_1$ and $F_2$ are the same, the molecule is as shown in formula 9A:

wherein〰〰
is as recited above.

Still another shaped dendritic macromolecule is a vinyl macromolecule of the general formula 10:

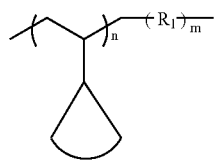

wherein n is an integer from 1 to about 1,500; wherein m is another integer from 0 to about 10,000; and wherein $R_1$ is a conventional vinyl monomer such as styrene, methyl methacrylate, methyl acrylate, vinyl acetate, butadiene, isoprene, and the like.

The novel dendritic macromolecule shapes of the present invention may be prepared according to the following general reaction schemes. The kite shaped structure of formula 3 may be prepared according to Reaction Scheme I.

Reaction Scheme I

wherein〰〰
is a linear polymer as previously defined; and X and Z are groups reactive with each other to form the linking group A and may be selected from such as alcohol, carboxylic acid, acid chloride, amine, isocyanate, phenol, sulfonyl halide, aldehyde, ketone, ester, thiolate, phenolate, carbanion, alkoxide, carboxylate, Grignard reagent, boronic acid, halogen and the like. Reactive groups X and Z are different and are selected for their ability to react and form a bond between the fragments that are attached to them. Some typical examples of coupling reactions that are well-known in the art are given below.

Coupling of the dendritic and linear polymers may be achieved by a number of reactions. For example, an ester linkage may be produced (i) by the reaction of an acyl halide with an alcohol in the presence of a catalyst such as dimethylamino pyridine, (ii) by reaction of a carboxylic acid with an alcohol at about 200° C. and high vacuum, (iii) by reaction of an acid with an alkyl halide in the presence of potassium carbonate and 18-crown6 in acetone heated at reflux, or (iv) by transesterification of an ester with an alcohol at 200° C. and high vacuum in the presence of a catalyst such as cobalt (II) acetate. Amide linkages may be produced by similar reactions as for esterification, but using an amine in place of the alcohol. Reaction of an alkyl or aryl halide with an alkoxide or aroxide (Williamson) gives an ether connection. A urethane or thiourethane linkage may be produced by reaction of an alcohol with an isocyanate or isothiocyanate, respectively, in the presence of a catalyst such as dibutyltin dilaurate. Alternatively, urea or thiourea connections may be achieved through coupling of an amine with an isocyanate or isothiocyanate, respectively. All of these coupling reactions are well-known in the art and can be found in classical textbooks such as *Advanced Organic Chemistry*, 3rd edition, by Jerry March, John Wiley & Sons, 1985 or *Organic Chemistry*, by Peter Vollhardt, Freeman, 1987. A living polymer chain may be terminated by the dendritic polymer containing different functional groups to give the product of Scheme 1 with different chemical linkages. For example, reaction of the carbanion of living polystyrene with an acyl halide, aldehyde, isocyanate, ester, or benzylic halide located at the focal point of the dendrimer gives a kite shaped molecule with a ketone, alcohol, amide, or benzylic linkage, respectively. These reactions are described in polymer textbooks such as *Polymer Synthesis*, by Paul Rempp and Edward W. Merrill, Huthig und Wepf, 1986 (p. 137) or *Principles of Polymerization*, 3rd edition, by George Odian, John Wiley & Sons, 1991 (p. 427).

The kite shaped macromolecule of formula 4 may be prepared according to Reaction Scheme II.

Reaction Scheme II

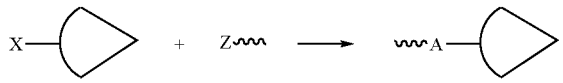

wherein X and Z are reactive groups as in Reaction Scheme 1 which react with each other to form linkage A. The general description for the process is the same as for Scheme 1.

Starburst polymer kite shapes of formula 5 may be prepared according to Reaction Scheme III.

Reaction Scheme III

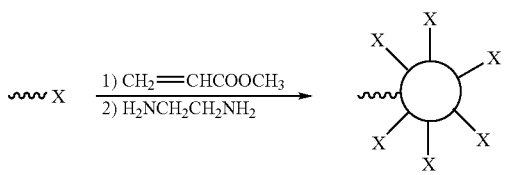

wherein X is selected from any of $NH_2$, $COOCH_3$, $CH_2OH$, CN, $CH_2Br$, and CHO, and wherein〜〜〜 is a linear polymer. Synthesis of a dendritic polymer by this divergent growth procedure using a linear polymer with a reactive chain end as the starting core produces a structure such as that shown in Reaction Scheme 3. Any existing divergent synthesis as described in the literature may be employed to incorporate different monomer units. For example, in Reaction Scheme 3 the reaction of an amino terminated linear polymer in which X=$NH_2$ with (1) methyl acrylate and then (2) ethylene diamine to give a first generation dendrimer attached to the linear polymer segment. This process of sequential reactions (1) and (2) may be repeated to produce larger dendritic polymers. Each sequential set of reactions with (1) methyl acrylate and then (2) ethylene diamine gives an additional generation dendrimer.

Reaction Scheme IV describes the production of the barbell shape of formula 6.

Reaction Scheme IV

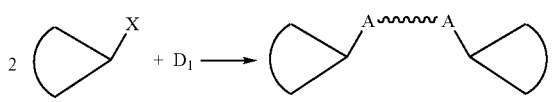

wherein $D_1$ is a telechelic polymer (a polymer containing one reactive group at each of the two chain ends) with a reactive end-group Z at each chain end, i.e. Z〜〜〜 Z, with X and Z defined as in General Reaction Scheme I. Typical coupling reactions that can be used are as described for Scheme I. The only difference being that, since the reactions must occur at both ends of a telechelic polymer, the amount of reagents must be increased accordingly to allow two rather than one coupling to occur.

The starburst dendritic macromolecule barbell of formula 8 is made in a manner similar to that of the kite star dendritic macromolecule of formula 5, excepting a telechelic linear polymer is employed instead of a monofunctional polymer as the starting core with starburst growth as shown in Scheme III occurring at both ends instead of one end only.

The triblock structure of formula 9 wherein $F_1$ and $F_2$ are the same are produced according to Reaction Scheme VI-A.

Reaction Scheme VI-A

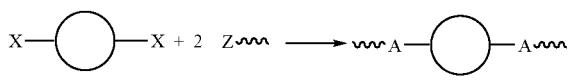

wherein X and Z are reactive groups as described for Scheme I, and wherein〜〜〜 is a linear polymer as recited previously.

Alternatively, Reaction Scheme VI-B may be used:

Reaction Scheme VI-B

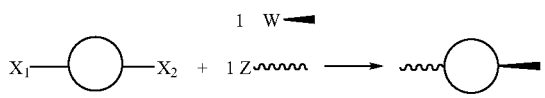

wherein the linear polymers◀━ and〜〜〜 are different from each other and may each be selected from the previous list of linear polymers.

Reaction Scheme VI-B shows the production of triblock structures of formula 9 wherein $X_1$, $X_2$, W and Z are different but selected from the same groups given for X and Z of Scheme 1. The reaction is accomplished in two steps starting with a coupling of $X_1$ with W◀━ while $X_2$ does not react. The second step involves coupling of $X_2$ with Z 〜〜〜.

For example, $X_1$ may be an amine, W an isocyanate, $X_2$ a phenol, and Z an acid chloride. Alternately, Z may be a boronic acid, $X_2$ an aryl bromide, $X_1$ a phenolate, and W a benzylic bromide. There are numerous other possibilities for the coupling reactions, some of which are in the description after Reaction Scheme I.

The vinyl macromolecule of the general formula 10 is shown in Reaction Scheme VII.

Reaction Scheme VII

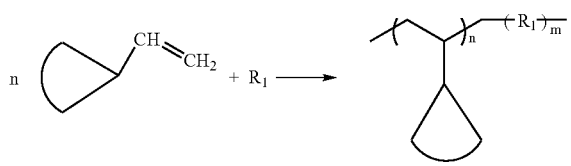

wherein n, m and $R_1$ are as described previously. Random polymerization of the two vinyl monomers is accomplished by mixing the desired proportions of the two monomers in an equal amount of solvent such as toluene or tetrahydrofuran, adding a small amount, such as 1 mole %, of a free radical initiator, such as azobisisobutyronitrile or benzoyl peroxide, stirring the mixture and heating it to 75° C. for 12 hours, cooling the mixture, then precipitating the copolymer into a suitable solvent such as hexane or methanol in which the copolymer does not dissolve. The copolymerization technique is well know in the art and reported in textbooks such as *Preparative Methods of Polymer Chemistry*, 2nd Ed., W. R. Sorenson and T. W. Campbell, Wiley Interscience 1968.

The present invention is also directed to processes for producing certain other known shaped dendritic based macromolecules. One such process involves the production of a knot shaped macromolecule of the general formula 11:

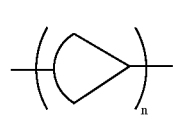

11

A representative example of such a structure is as follows:

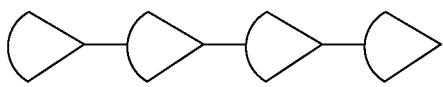

The process for making such a macromolecule is shown in Reaction Scheme VIII.

Reaction Scheme VIII

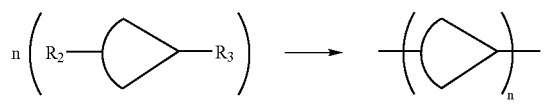

wherein $R_2$ and $R_3$ are different and mutually reactive and $R_2$ is a reactive group such as COOH, OH, COOCH$_3$, CONH$_2$, COO, carboxylate, NCO, halogen, or alkoxy; and wherein $R_3$ is a reactive group such as COOH, OH, COOCH$_3$, NCO, or as listed above.

Still another process for producing macromolecules according to the present invention is shown by Reaction Scheme IX, wherein star molecules produced by a one step process are synthesized.

Reaction Scheme IX

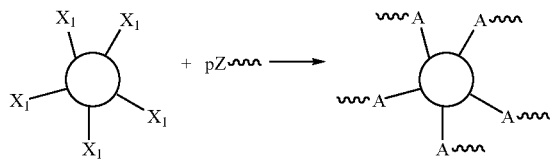

wherein each X is a functional group, which may be the same or different; wherein Z~~~
is a linear polymer such as polystyrene, polycarbonate, polyester, polyamide, polycarbonate, polyolefin, polyethylene glycol, polyacrylate, polymethacrylate, polysulfone, polyetherketone, polyacetal, polyether, polythioether, polyoxazoline, polyphosphazene, polysiloxane, polyanhydride, polyurethane, polyphenylene, polysaccharide, and other vinyl polymers derived from simple monomers such as vinyl acetate, vinyl chloride, acrylonitrile or vinyl carbazole, or styrene; X and Z are mutually reactive to form linkage A; and wherein p equals or exceeds the number that corresponds to the number of X groups. The X groups may be present in the amount shown or in lesser amounts down to about 3 and greater amounts up to about 768. Coupling occurs as described Reaction Scheme I except that a larger amount of Z is used and the reaction times are generally longer.

The following examples demonstrate the production of specific macromolecules covered by the above general formulas using specific reactions. They are only intended as examples of the various procedures which may be used to prepare the various macromolecular architectures. Variations include incorporation of different sizes of dendrimers, different structures of dendrimers, different lengths of linear chains, and different chemical structures of the linear polymer chains. All percents and parts are by weight unless otherwise specified.

EXAMPLE 1

Preparation of Peripherally Attached Poly(ethylene glycol)-Dendrimer Block Copolymers (Kite Shape, Scheme II) (FIG. 1)

A. Preparation of CN—[G-3]-OPhCH$_3$: Compound 2

A mixture of CN—[G-3]—Br (Compound 1) (5.0 g, 3.0 mmol), p-cresol (0.39 g, 3.6 mmol), potassium carbonate (0.5 g, 3.6 mmol), and 18-crown-6 (0.15 g, 0.57 mmol) in acetone (50 mL) was heated at reflux under N$_2$ for 12 h. Dendrimer CN—[G-3]—Br is prepared by the reaction procedure of U.S. Pat. No. 5,041,516. The specific compound is compound 27 on page 1073 of Wooley et al., *J. Chem. Soc.*, Perkin Trans, 1, 1991, 1059. The reaction mixture was evaporated to dryness, and the residue was partitioned between methylene chloride/water. The aqueous layer was extracted with CH$_2$Cl$_2$ (3×25 mL) and the combined CH$_2$Cl$_2$ extracts were dried over MgSO$_4$ and concentrated in vacuo. The product was purified by flash chromatography eluting with 5% hexanes/CH$_2$Cl$_2$ to give the title compound 2 as a colorless glass: yield 92%.

B. Preparation of HOOC—[G-3]—OPhCH$_3$: Compound 3

To a solution of CN—[G-3]—OPhCH$_3$ 2 (1.0 g, 0.59 mmol) in 1,4-dioxane (10 mL) was added 30% hydrogen peroxide (5 mL) and potassium hydroxide (2 g dissolved in ca. 2 mL of water). The mixture was heated at reflux and then ethanol was added until a one-phase mixture was formed (ca. 4 mL). The reaction mixture was then heated at reflux overnight, cooled, acidified with glacial acetic acid, evaporated to dryness, and partitioned between chloroform and water. The aqueous layer was extracted with chloroform (3×25 mL) and the combined CHCl$_3$ extracts were dried over MgSO$_4$ and concentrated in vacuo. The crude product was purified by flash chromatography eluting with CH$_2$Cl$_2$ gradually increasing to 10% ether/CH$_2$Cl$_2$ to give the title compound as a colorless glass: yield 78%.

C. Preparation of C$_{12}$H$_{25}$(OCH$_2$CH$_2$)$_{23}$O—[G-3]—OPhCCH$_3$: Compound 5

Into a 25 mL round bottom flask equipped with a magnetic stir bar, hot oil bath and vacuum take-off adapter was placed HOOC—[G-3]—OPhCH$_3$ (0.5 g, 0.3 mmol), and Brij$^R$35 (compound 4 (C$_{12}$H$_{25}$(OCH$_2$CH$_2$)$_{23}$OH, 0.7 g, 0.6 mmol), purchased from Aldrich Chemical Co. After high vacuum (0.03 mm Hg) was achieved, the reaction mixture was heated at 220° C. with stirring for 12 hours. The reaction was monitored by gel permeation chromatography. The reaction mixture was dissolved in tetrahydrofuran, and purified by precipitation into hexanes, precipitation into methanol and then flash chromatography eluting with CH$_2$Cl$_2$ gradually increasing to 10% ether/-CH$_2$Cl$_2$ to give the desired product 5 as a tan colored glass: yield 82%.

EXAMPLE 2

Figure 2:
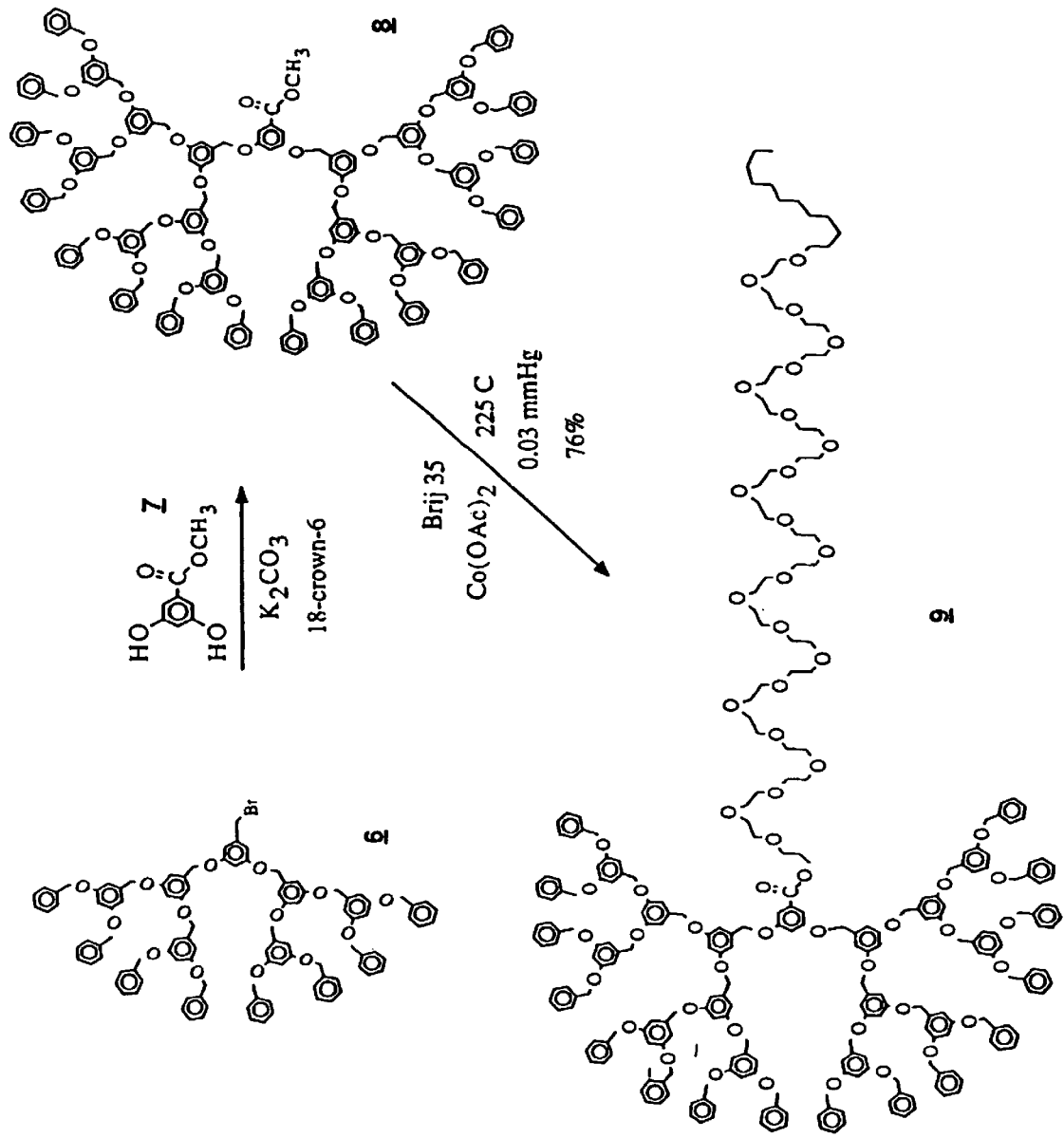

Preparation of Focal Point Attached Poly(ethylene glycol)-Dendrimer Block Copolymers via Esterification Reaction (Kite Shape, Scheme I) (FIG. 2)

A. Preparation of [G-4]—COOMe: Compound 8

A mixture of [G-3]—Br 6 (2.35 g, 1.42 mmol, 2.1 equiv.), methyl-3,5-dihydroxybenzoate (0.114 g, 0.679 mmol), potassium carbonate (0.21 g, 1.5 mmol, 2.2 equiv.) and 18-crown-6 (0.04 g, 0.15 mmol, 0.2 equiv.) in acetone was heated at reflux, under N$_2$, for 16 h. The starting compound 6 may be prepared as shown in *J. Am. Chem. Soc.*, 112, 1990, 7638 page 7646, compound #12. The solvent was removed under reduced pressure and the residue was partitioned between water and methylene chloride. The aqueous layer was extracted with CH$_2$Cl$_2$ and the combined CH$_2$Cl$_2$ extracts were dried over MgSO$_4$ and evaporated to dryness. The product 8 was purified by flash chromatography eluting with CH$_2$Cl$_2$ to give [G-4]—COOMe as a colorless glass: yield 87%.

B. Preparation of [G-4]—COO(CH$_2$CH$_2$O)$_{23}$C$_{12}$H$_{25}$: Compound 9

Into a 25 mL round bottom flask equipped with a hot oil bath, stir bar, and vacuum take-off adapter was placed [G-4]—COOMe 8 (0.5 g, 0.15 mmol), Brij$^R$35 (C$_{12}$H$_{25}$(OCH$_2$CH$_2$)$_{23}$OH, 0.45 g, 0.38 mmol, 2.5 mmol, 2.5 equiv.), and cobalt(II) acetate tetrahydrate (0.1 g. 0.4 mmol. 2.5 equiv.). After high vacuum (0.03 mm Hg) was achieved, the reaction mixture was placed into the 210° C. hot oil bath, and heated with stirring for 16 hours. The reaction was monitored by gel permeation chromatography. The reaction mixture was dissolved in tetrahydrofuran, and purified by precipitation into hexanes, precipitation into methanol and then flash chromatography eluting with CH$_2$Cl$_2$ gradually increasing to 10% ether/CH$_2$Cl$_2$ to give the desired product 9 as a tan colored glass: yield 80%.

EXAMPLE 3

Figure 3:
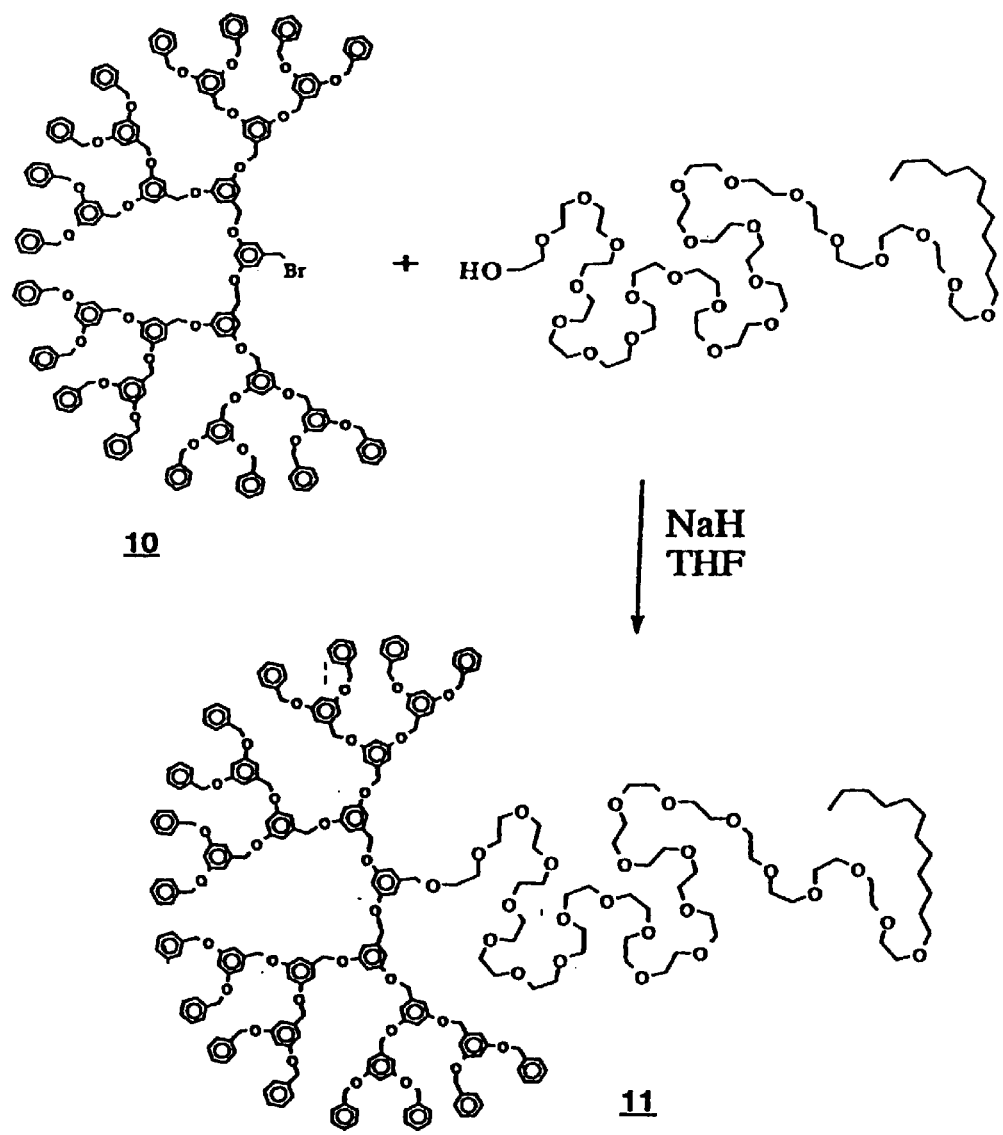

Preparation of Focal Point Attached Poly(ethylene glycol)-Dendrimer Block Copolymers via Ether-forming Reaction (Kite Shape, Scheme I) (FIG. 3)

To a mixture of [G-4]—Br 10 (2.0 g, 0.60 mmol, 1 equiv.) (prepared as in *J. Am. Chem. Soc.*, 1990, 112, 7638, Compound 14 at page 7646), and Brij$^R$35 (0.60 g, 0.50 mmol, 0.8 equiv.) in THF at room temperature was added sodium hydride (0.06 g, 2.5 mmol, 4.2 equiv.). The reaction mixture was stirred at room temperature under N$_2$. The progress of the reaction was monitored by size exclusion chromatography, which showed progressive disappearance of the starting materials. After 24 hours, the reaction mixture was added dropwise to a mixture of acetone and methanol (1:3) and processed in a standard fashion as described by Itsuno et al., *Polym. J.*, 1991, 23, 1045) to afford the desired product 11 in 79% yield.

EXAMPLE 4

Figure 4:
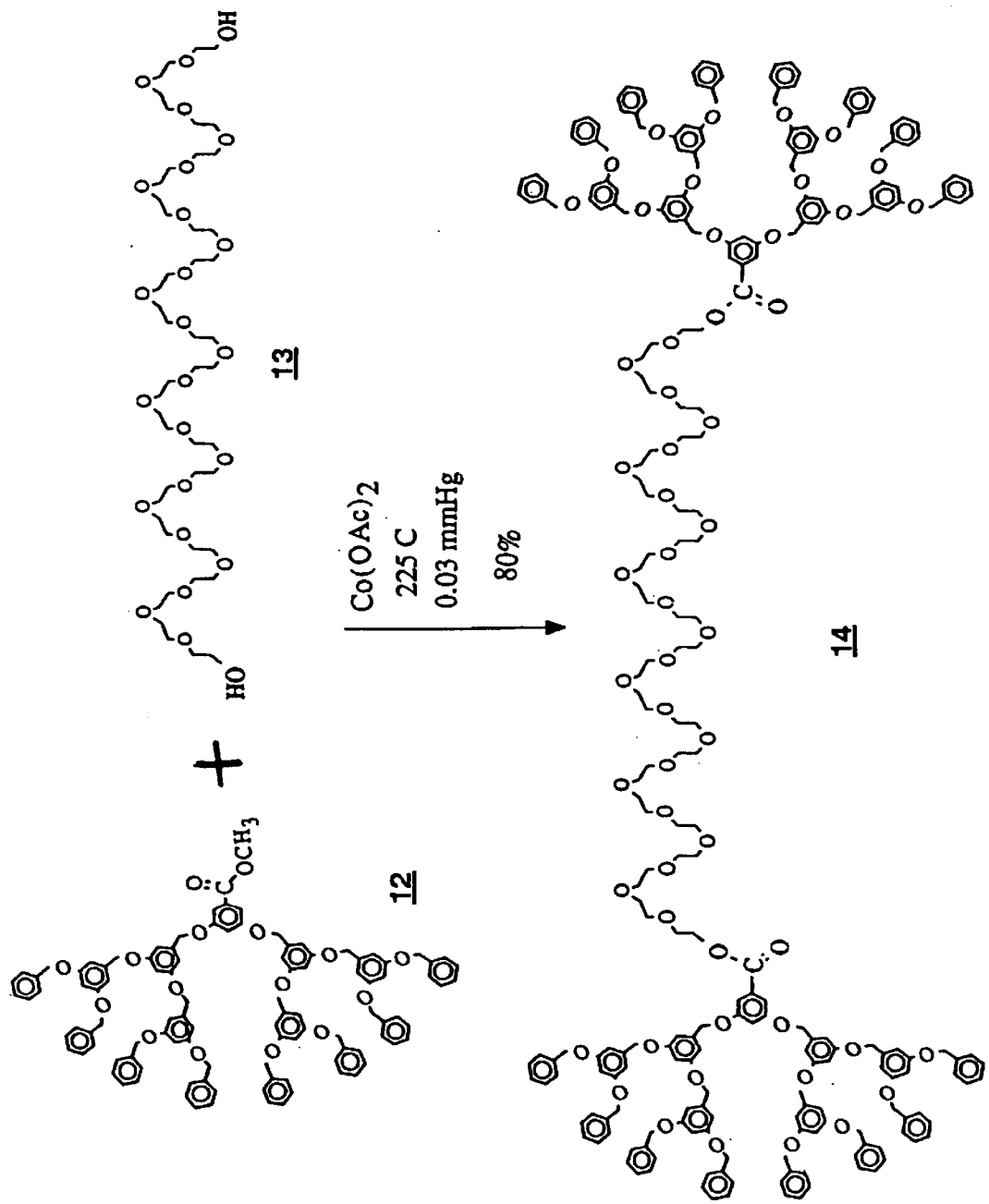

Preparation of Dendrimer-Poly(ethylene glycol)-Dendrimer Block Copolymers via Esterification Reaction (Barbell Shape, Scheme IV) (FIG. 4)

A. Preparation of [G-3]—COOMe: Compound 12

A mixture of [G-2]—Br (2.5. g. 3.1 mmol, 2.1 equiv.), methyl-3,5-dihydroxybenzoate (0.25 g, 1.5 mmol), potassium carbonate (0.45 g, 3.3 mmol, 2.2 equiv.), and 18-crown-6 (0.08 g, 0.3 mmol, 0.2 equiv.) in acetone was heated at reflux, under N$_2$, for 16 h. The starting [G-2]—Br was prepared as shown in *J. Am. Chem. Soc.*, 1990, 112, 7638, compound 10 page 7645. The solvent was removed under reduced pressure and the residue was partitioned between water and methylene chloride. The aqueous layer was extracted with CH$_2$Cl$_2$ and the combined CH$_2$Cl$_2$ extracts were dried over MgSO$_4$ and evaporated to dryness. The product 12 was purified by flash chromatography eluting with CH$_2$Cl$_2$ to give [G-3]—COOMe as a colorless glass: yield 88%.

B. Preparation of [G-3]—CO—(OCH$_2$CH$_2$)$_{46}$—OOC—[G-3]: Compound 14

Into a 25 mL round bottom flask equipped with a hot oil bath, stir bar, and vacuum take-off adapter was placed 12 [G-3]—COOMe (1.0 g, 0.62 mmol, 2.3 equiv.), poly(ethylene glycol) 13 (Scientific Polymer Products, Inc., narrow standard, M$_w$=2064, M$_n$=1967, 0.55 g, 0.27 mmol), and cobalt (II) acetate tetrahydrate (0.015 g, .0.06 mmol, 0.2 equiv.). After high vacuum (0.03 mm Hg) was achieved, the reaction mixture was heated at 210° C. with stirring for 16 hours. The reaction was monitored by gel permeation chromatography. The reaction mixture was dissolved intetrahydrofuran, and purified by precipitation into hexanes, precipitation into methanol and then flash chromatography eluting with CH$_2$Cl$_2$ gradually increasing to 10% ether/CH$_2$Cl$_2$ to give the desired product, 14, as a tan colored glass: yield 52%.

EXAMPLE 5

Figure 5:
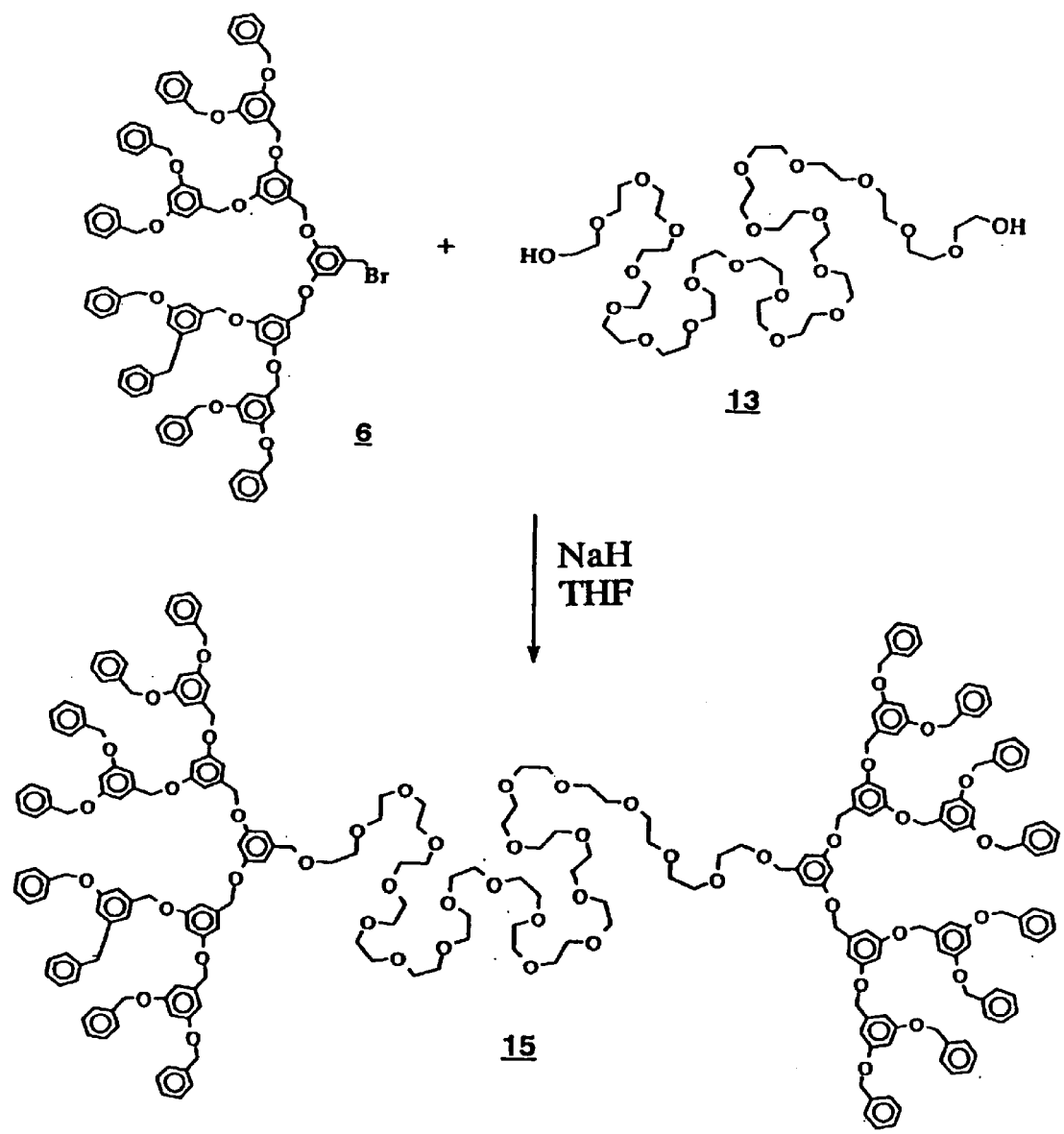

Preparation of Dendrimer-Poly(ethylene glycol)-Dendrimer Block Copolymers via Ether-forming Reaction (Barbell Shapes, Scheme IV) (FIG. 5)

A. Reaction of Telechelic Hydroxy Terminated Polyethylene Glycol with [G-3]—Br

A reaction of telechelic hydroxy terminated polyethylene glycol with [G-3]—Br 6, Polyethylene glycol (PEG) 13 terminated at both ends with hydroxyl groups and having narrow molecular weight distribution (<1.08) with molecular weight 3,000 was used. 0.31 g PEG dissolved in tetrahydrofuran was treated with 0.01 g of sodium hydride and 0.29 g of ether-linked [G-3]—Br. The reaction mixture was stirred at 65° C. for 65 hrs under inert atmosphere. The reaction mixture was poured in acetone and the liquid phase concentrated, then precipitated into hexanes. The product 15 was separated by chromatography to afford 63% of the desired.polyethylene glycol terminated with [G-3] at both ends 15.

B. Reaction of Telechelic Hydroxy Terminated Polyethylene Glycol with [G-4]—Br.

Polyethylene glycol (PEG) terminated at both ends with hydroxyl groups and having narrow molecular, weight distribution (<1.05) with a molecular weight 11,000 was used in a repeat of the above. The procedure was as described above except that ether linked [G-4]—Br was used. The yield of purified product was 69%.

EXAMPLE 6

Figure 6:
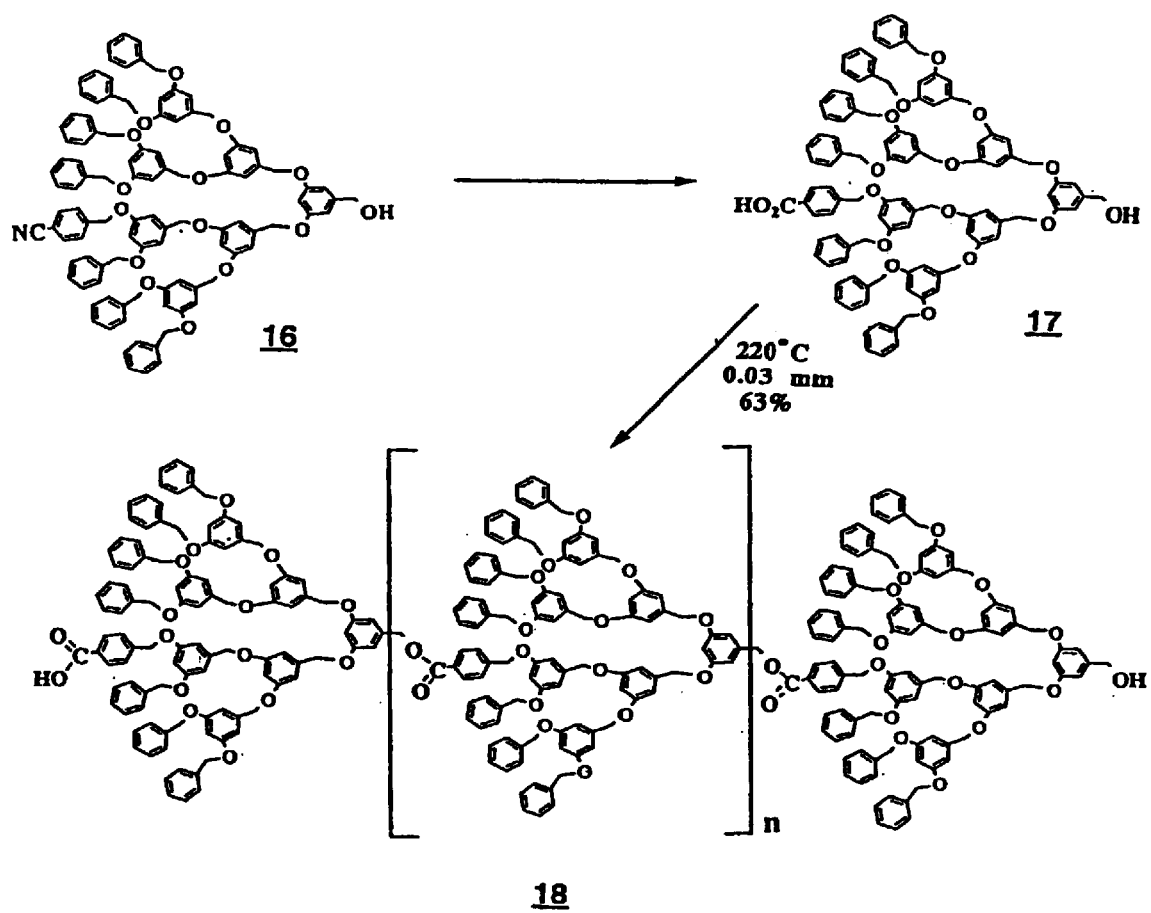

Preparation of Dendrimer Homopolymers by Step-Growth Polymerization (Knot Shape, Scheme VIII) (FIG. 6)

A. Preparation of HOOC—[G-3]—OH: Compound 17

To a solution of NC—[G-3]—OH 16 (2.0 g, 1.2 mmol) (prepared as in *J. Chem. Soc.* Perkin Trans 1 1991, 1059, Compound 26 on page 1073) in 1,4-dioxane (10 mL) was added 30% hydrogen peroxide (10 mL) and potassium hydroxide (4 g dissolved in ca. 5 mL of water). The mixture was heated at reflux and then ethanol was added until a one-phase mixture was formed (ca. 10 mL). The reaction mixture was then heated at reflux overnight, evaporated to dryness, and partitioned between chloroform and water. The aqueous layer was extracted with chloroform (3×25 mL) and the combined CHCl$_3$ extracts were dried over MgSO$_4$ and concentrated. The crude product was purified by flash chromatography eluting with CH$_2$Cl$_2$ gradually increasing to 10% ether/CH$_2$Cl$_2$ to give the title compound 17 as a colorless glass: yield 84%.

B. Preparation of —(—OC—[G-3]—O—)$_n$: Compound 18

The starting AB monomer, HOOC—[G-3]—OH 17 (1.0 g, 0.61 mmol), was homopolymerized at 200° C. and 0.6 mm Hg for 24 h. The reaction mixture was dissolved in tetrahydrofuran, and precipitated into hexanes to give the title compound 18 as a tan colored glass: yield 83%. M$_w$=430,000, M$_n$=180,000.

EXAMPLE 7

Figure 7:
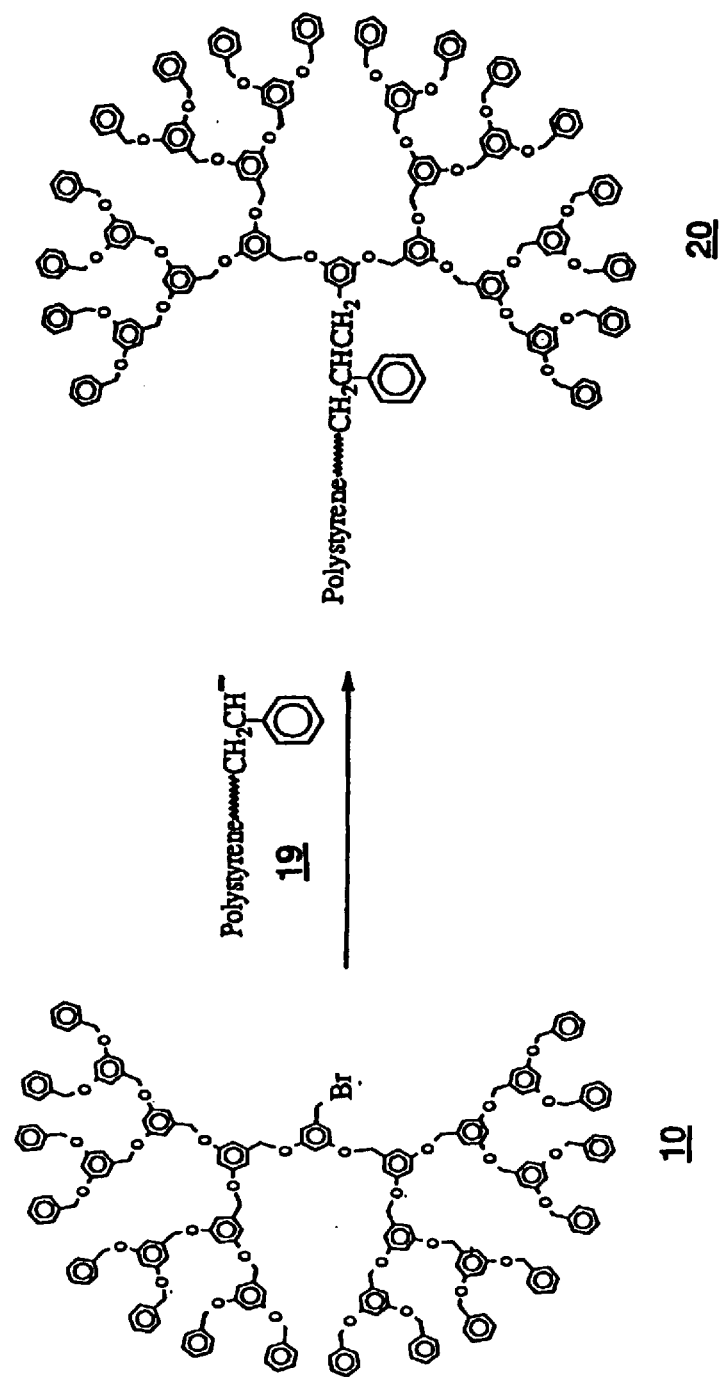

Preparation of Dendrimer-Terminated Vinyl Polymer: Compound 20 (Kite Shape, Scheme I) (FIG. 7)

The reaction was performed using high vacuum anionic polymerization techniques with break-seals using thoroughly dry equipment, solvent and reagents. The polymerization of styrene carried out at −78° C. in THF involved 0.897 g of styrene and 0.3 ml of a 0.04M solution of cumyl potassium in THF. The orange-red living polystyrene 1 g that is obtained was treated under stirring with a cooled solution of 0.0495 g of [G-4]—Br 10 in THF to give a slightly yellow solution. The mixture was stirred at −30° C. for one hour then at room temperature for 10 hours. The usual work-up was then carried out as follows: after addition of a small amount of methanol, the polymer was precipitated from THF into methanol to afford 91% yield of the dendrimer end-cappped polymer, 20.

EXAMPLE 8

Figure 8:
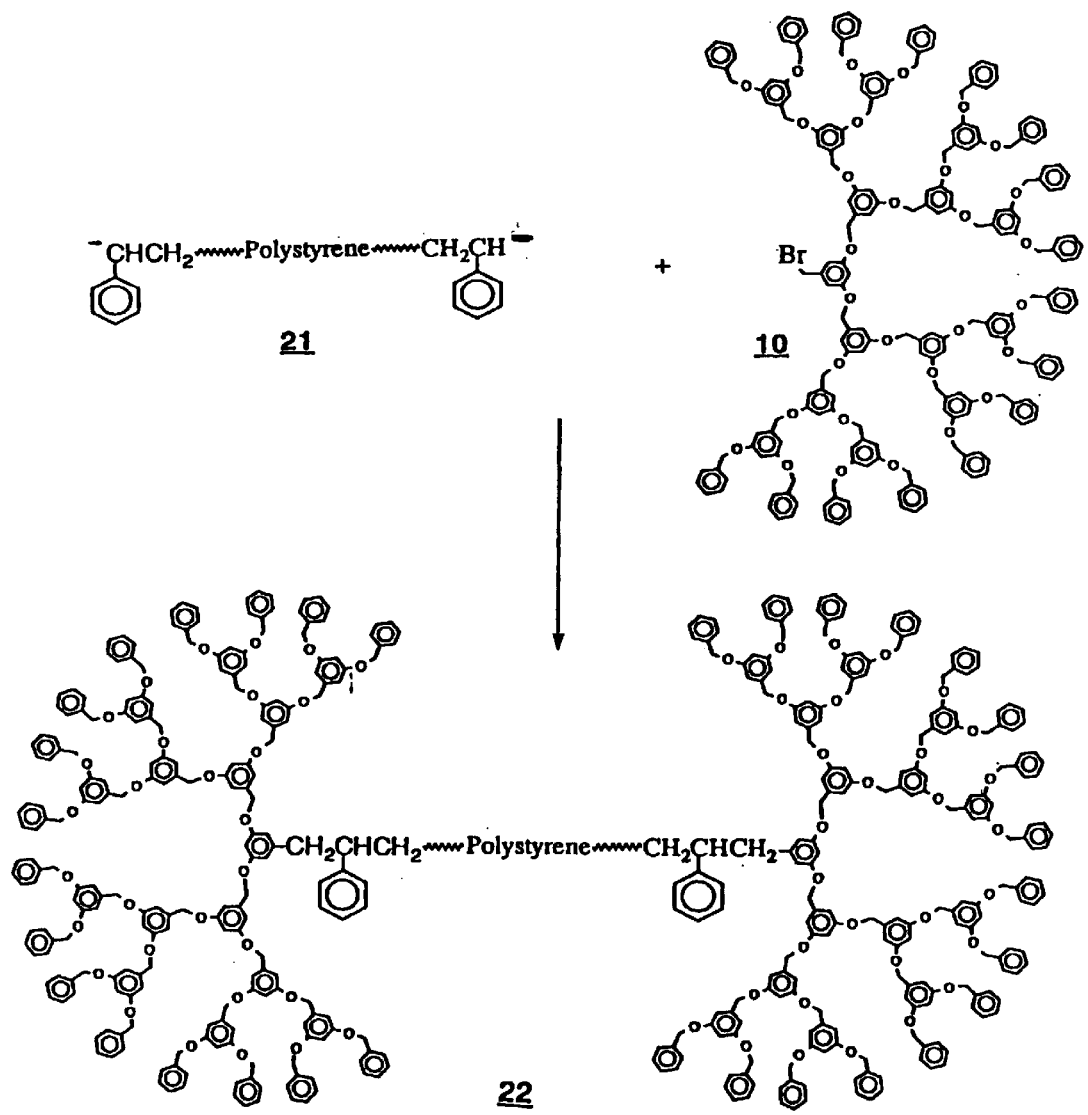

Preparation of Telechelic Dendrimer-Terminated Vinyl Polymer: Compound 22 (Barbell Shape, Scheme IV) (FIG. 8)

The reaction was performed using high vacuum anionic polymerization techniques with break-seals using thoroughly dry equipment, solvent and reagents. The polymerization carried out at −78° C. in THF involved styrene monomer and a solution of a-methylstyrene tetramer in THF as initiator. This afforded a living polystyrene which is highly colored and has reactive anionic ends (both ends) 21. The-final telechelic triblock copolymer (dendritic polyether-polystyrene-dendritic polyether) was obtained by adding 2 equivalents of dendritic polyether having a reactive bromide focal point (such as [G-4]—Br) to the living two-ended polystyrene 21 (the color disappears immediately as the reaction occurs). After the usual work up as described in Example 7 (addition of a small amount of methanol and precipitation from THF into methanol), the desired tri-block (dendritic polyether-polystyrene-dendritilc polyether) polymer 22 was obtained.

EXAMPLE 9

Figure 9A:
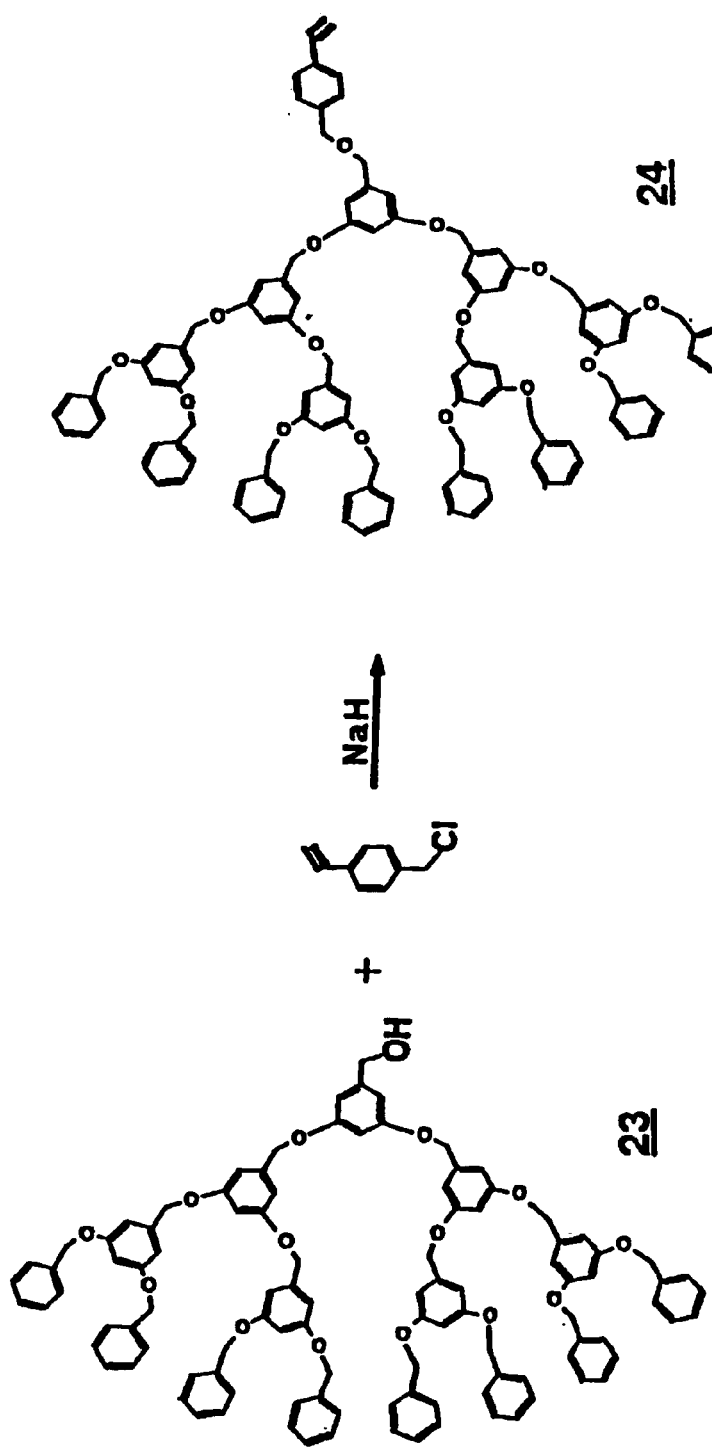
Figure 9B:
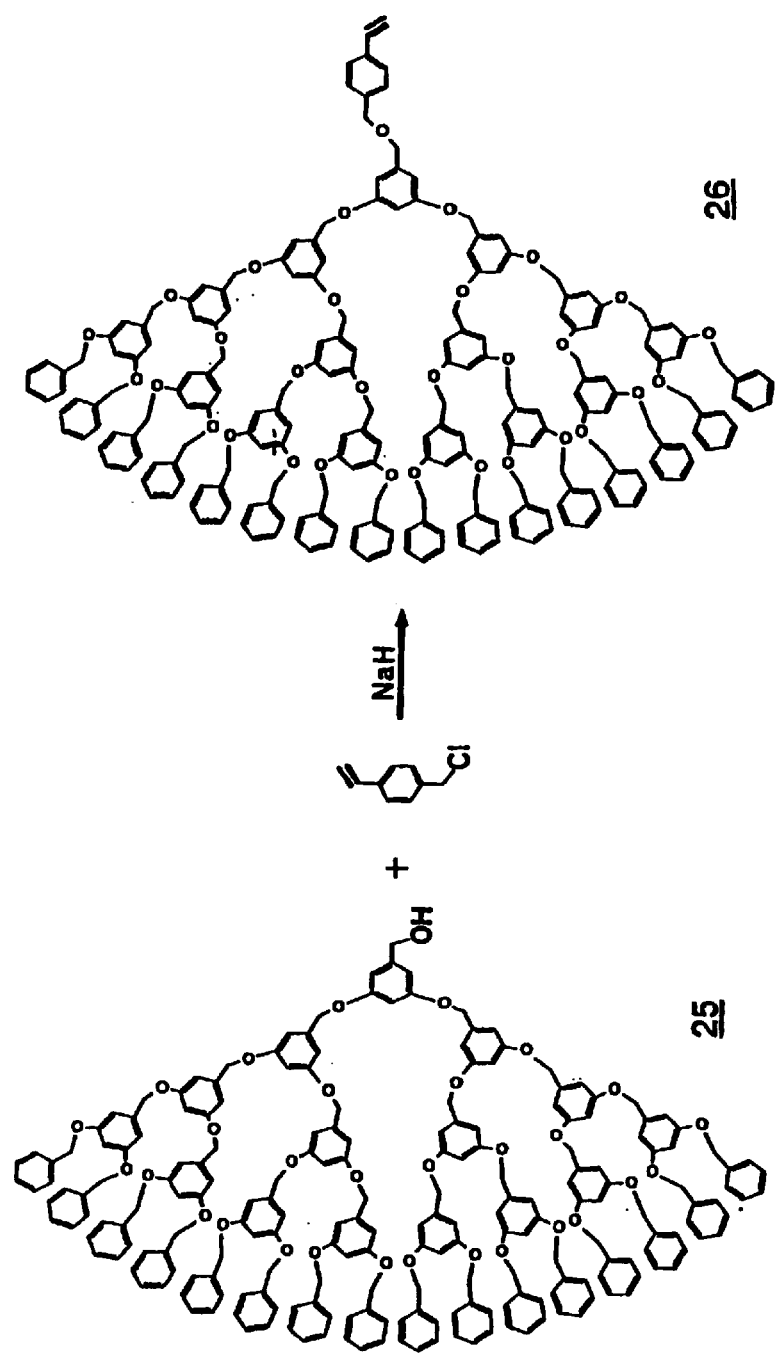
Figure 9C:
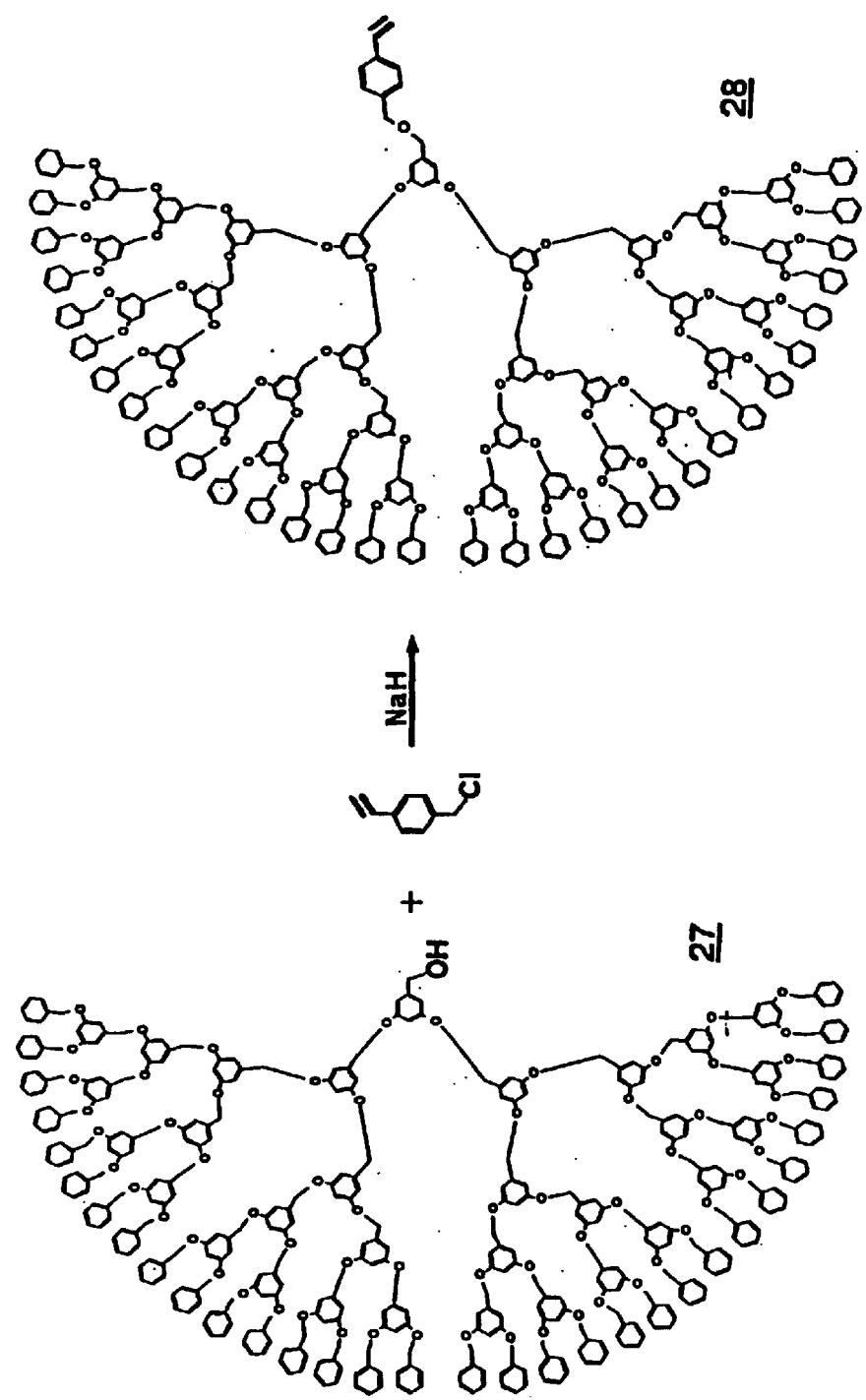

Preparation of Dendritic Copolymers Using Dendritic Vinyl Macromonomer with Vinyl Monomer (Scheme VII) (FIGS. 9A, 9B, and 9C)

The general procedure for the synthesis of the macromonomers was as follows: to a solution of the benzylic alcohol (1.00 equivs.) in freshly distilled dry THF was added sodium hydride (60% dispersion in oil) (1.30 equivs.) and the reaction mixture stirred at room temperature under nitrogen for 30 minutes. 4-Chloromethyl styrene obtained from Eastman Kodak Co. (5.0 equiv.) in dry THF was added and the mixture heated at reflux for 18 hours. The reaction mixture was cooled, carefully, hydrolyzed, and evaporated to dryness. The residue was partitioned between water and $CH_2Cl_2$ and the aqueous layer extracted with $CH_2Cl_2$ (3×). The organic layers were then dried ($Mg_2SO_4$) and evaporated to dryness under reduced pressure. The crude product was purified as outlined below.

The starting materials [G-3]—OH, [G-4]—OH, and [G-5]—OH are all reported by C. J. Hawker, J. M. J. Frechet, *J. Am. Chem. Soc.*, 1990, 112, 7638. [G-3]—OH is compound 11 page 7645, [G-4]—OH is compound 13 page 7646, and [G-5]—OH is compound 15 page 7646.

A. Preparation of [G-3]-styrene: Compound 24

This was prepared from [G-3]—OH 23 and purified by flash chromatography eluting with 2:3 hexane/$CH_2Cl_2$ gradually increasing to $CH_2Cl_2$ to give 7 as a colorless glass: yield 77%; (Found: C, 79,98; H, 6.03. $C_{114}H_{100}O_{15}$ requires C, 80.07; H, 5.89%).

B. Preparation of [G-4]-styrene: Compound 26

This was prepared from [G-4]—OH 25 and purified by flash chromatography eluting with 1:3 hexane/$CH_2Cl_2$ gradually increasing to $CH_2Cl_2$ to give 26 as a colorless glass: yield 73%; (Found: C, 79.58; H. 5.95, $C_{226}H_{196}O_{31}$ requires C, 79.65; H, 5.80%).

C. Preparation of [G-5]-styrene: Compound 28

This was prepared from [G-5]—OH 27 and purified by flash chromatography eluting with 1:3 hexane/$CH_2Cl_2$ gradually increasing to $CH_2Cl_2$ to give 28 as a colorless glass: yield 67%; (Found: C, 79.35; H, 6.00. $C_{4500}H_{3880}O_{63}$ requires C, 79.44; H, 5.75%).

D. Copolymerization of the Macromonomers with Styrene

All the copolymerizations were carried out as described below for a 1:4 mixture (by weight) of [G-3]-styrene with styrene.

To the 3rd generation macromonomer 24 (600 mg, 0.35 mmol) was added freshly distilled styrene (2.40 g, 23.1 mmol), AIBN (40 mg, 0.24 mmol, 1.0 mol percent), freshly distilled and degassed toluene (2.50 g) and the solution heated at 70–75° C. under argon for 26 hours. The reaction mixture was then precipitated into hexane, the precipitated solid collected and reprecipitated into 1:3 isopropanol/acetone. The purified product was then reprecipitated into methanol and the white solid collected by filtration: yield 64%.

All other copolymerization were carried out using a similar procedure, feed ratios, yields, and molecular weight data (polystyrene standards) are shown in Table 1.

TABLE 1

Copolymers of Dendritic Macromonomers with Styrene

| Macromonomer | | Macromonomer, wt % | | Yield | Copolymer | |
|---|---|---|---|---|---|---|
| Generation | Structure | feed | prod. | % | $M_w$ | $M_n$ |
| [G-3] | 24 | 1.0 | 1.0 | 76 | 42000 | 28000 |
| [G-3] | 24 | 3.0 | 3.2 | 72 | 44000 | 31000 |
| [G-4] | 26 | 3.0 | 3.1 | 69 | 40000 | 27000 |
| [G-5] | 28 | 3.0 | 2.9 | 68 | 45000 | 34000 |
| [G-3] | 24 | 20.0 | 21.0 | 64 | 49000 | 35000 |
| [G-4] | 26 | 20.0 | 20.7 | 62 | 53000 | 37000 |
| [G-5] | 28 | 20.0 | 19.6 | 61 | 50000 | 34000 |
| [G-3] | 24 | 30.0 | 31.3 | 59 | 71000 | 46000 |
| [G-3] | 24 | 40.0 | 41.3 | 52 | 79000 | 48000 |

What is claimed is:

1. A macromolecule composed of a single dendritic polymer having a focal point and a linear polymer, said macromolecule having the shape of a three-dimensional kite and represented by the formula 3:

3 wherein ∿∿∿ represents a linear polymer which is absent from the dendritic polymer and is bonded to the focal point of the dendritic polymer through a connecting group A.

2. The macromolecule of claim 1 wherein A is selected from any of $CH_2$, $CH_2O$, COO, CONH, O, $CH_2Ph$, NHCOO, NHCONH, $Si(CH_3)_2$, CH(OH), CO, S, SO, $SO_2$, $SO_2NH$, $CH_2CH(Ph)_2$, $CH_2CH(Ph)CH_2$, CH=CH, or Ph.

3. The macromolecule of claim 1 wherein the linear polymer is selected from any of polystyrene, polycarbonate, polyester, polyamide, polycarbonate, polyolefin, polyethylene glycol, polyacrylate, polymethacrylate, polysulfone, polyetherketone, polyacetal, polyether, polythioether, polyoxazoline, polyphosphazene, polysiloxane, polyanhydride, polyurethane, polyphenylene, polysaccharide, poly(vinyl acetate), poly(vinyl chloride), polyacrylonitrile or poly(vinyl carbazole).

4. The macromolecule of claim 1, wherein the linear polymer is polyethylene glycol and A is COO.

5. The macromolecule of claim 1, wherein the linear polymer is polyethlene glycol and A is $CH_2O$.

6. The macromolecule of claim 1, wherein the linear polymer is polystyrene and A is $CH_2CH(Ph)CH_2$.

7. A macromolecule composed of a single dendritic polymer having a periphery functional group and a linear polymer, said macromolecule having the shape of a three-dimensional kite and represented by formula 4:

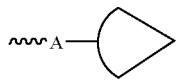
4 wherein A is a connecting group and ∼∼∼ is a linear polymer which is absent in the dendritic polymer and is bonded to the dendritic polymer through the periphery functional group.

8. The macromolecule of claim 7 wherein A is selected from any of $CH_2$, $CH_2O$, COO, CONH, O, $CH_2Ph$, NHCOO, NHCONH, $Si(CH_3)_2$, CH(OH), CO, S, SO, $SO_2$, $SO_2NH$, $CH_2CH(Ph)_2$, $CH_2CH(Ph)CH_2$, CH=CH, or Ph.

9. The macromolecule of claim 7 wherein the linear polymer is selected from any of polystyrene, polycarbonate, polyester, polyamide, polycarbonate, polyolefin, polyethylene glycol, polyacrylate, polymethacrylate, polysulfone, polyetherketone, polyacetal, polyether, polythioether, polyoxazoline, polyphosphazene, polysiloxane, polyanhydride, polyurethane, polyphenylene, polysaccharide, poly(vinyl acetate), poly(vinyl chloride), polyacrylonitrile or poly(vinyl carbazole).

10. The macromolecule of claim 6, wherein the linear polymer is polyethylene glycol and A is COO.

11. A macromolecule composed of two dendritic polymers having the shape of a barbell and represented by the general formula:

wherein A is a connecting group and wherein ∼∼∼ is a linear polymer which is bonded to a focal group in each of the two dendritic polymers.

12. The macromolecule of claim 11 wherein each A is selected from any of $CH_2$, $CH_2O$, COO, CONH, O, $CH_2Ph$, NHCOO, NHCONH, $Si(CH_3)_2$, CH(OH), CO, S, SO, $SO_2$, $SO_2NH$, $CH_2CH(Ph)_2$, $CH_2CH(Ph)CH_2$, CH=CH, or Ph.

13. The macromolecule of claim 11 wherein the linear polymer is selected from any of polystyrene, polycarbonate, polyester, polyamide, polycarbonate, polyolefin, polyethylene glycol, polyacrylate, polymethacrylate, polysulfone, polyetherketone, polyacetal, polyether, polythioether, polyoxazoline, polyphosphazene, polysiloxane, polyanhydride, polyurethane, polyphenylene, polysaccharide, poly(vinyl acetate), poly(vinyl chloride), polyacrylonitrile or poly(vinyl carbazole).

14. The macromolecule of claim 11, wherein A is COO and wherein the linear polymer is polyethylene glycol.

15. The macromolecule of claim 11, wherein A is $CH_2O$ and the linear polymer is polyethylene glycol.

* * * * *